Patented Jan. 22, 1952

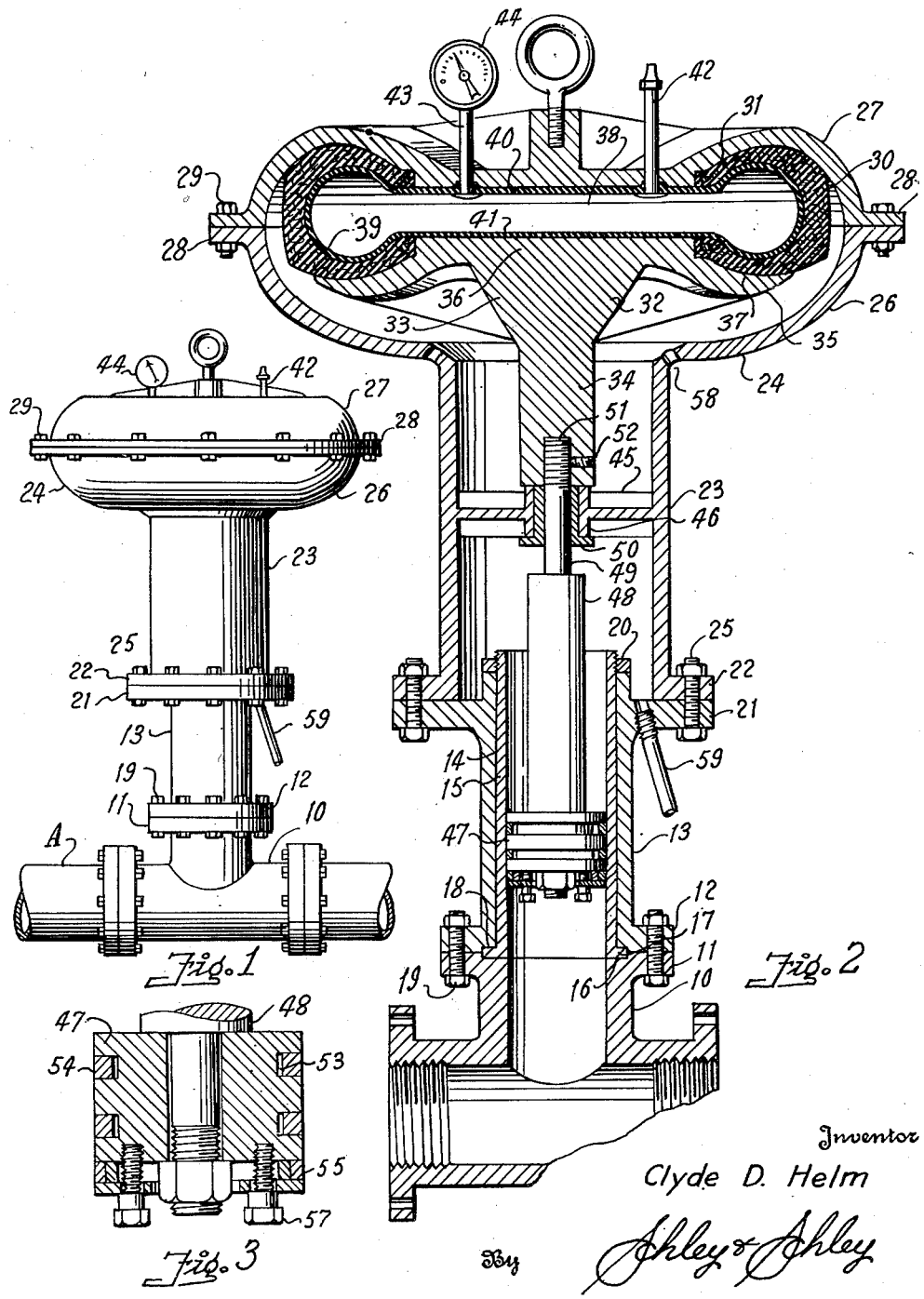

2,583,215

UNITED STATES PATENT OFFICE 2,583,215

FLUID PRESSURE SURGE DEVICE

Clyde D. Helm, Fort Worth, Tex., assignor to Mid-Continent Supply Company, Inc., Fort Worth, Tex., a corporation of Delaware Application February 7, 1948, Serial No. 6,979

7 Claims. (Cl. 138—26)

This invention relates to new and useful improvements in fluid pressure surge devices.

One object of the invention is to provide an improved device adapted to be connected to a flow line conducting fluid under pressure and arranged to absorb pressure surges and impacts.

Another object of the invention is to provide an improved flow-line pressure surge device having piston means exposed to the pressure fluid and pneumatic means resisting movement of the piston means by the pressure of fluid for absorbing or compensating pressure surges and impacts.

A further object of the invention is to provide a device of the character described wherein an ordinary motor vehicle tire casing may be used as a part of the pneumatic means, thus making for convenience, ready replacement and reasonable cost.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is an elevation of a surge device constructed in accordance with the invention, Fig. 2 is an enlarged, transverse, vertical, sectional view of the device, and Fig. 3 is a sectional view of the piston.

In the drawing, the numeral 10 designates a flanged pipe T which is adapted to be connected in the fluid line A to which the device is applied. The lateral leg of the T has an annular flange 11 which receives the base flange 12 of a tubular pedestal 13. The pedestal has a bore 14 of such diameter as to receive a liner 15, whereby the bore of the liner is substantially flush with the bore of the T member. The liner 15 constitutes a piston cylinder. The flange 11 has an annular seat 16 and the lower end of the liner is flanged at 17 so as to rest in said seat and project into an annular recess 18 in the bottom of the pedestal. The flanges are fastened together by bolts 19 and the liner is thus held in place.

The upper end of the liner extends a short distance above the top of the pedestal and is externally screw-threaded. A retaining ring 20 is screwed onto the upper end of the liner and abuts the upper end of the pedestal. The pedestal has a radially extending annular flange 21 spaced a short distance below its upper end for supporting an annular flange 22 formed integral with the base of a tubular shank 23 forming part of a surge chamber, indicated generally by the numeral 24. The internal diameter of the shank is considerably larger than the diameter of the pedestal. The flanges 21 and 22 are secured together by bolts 25.

The upper end of the shank 23 is merged or flared outwardly into a lower bowl section 26 which forms a part of the chamber 24. The bowl section 26 supports an upper cover section 27, the sections being fastened together by integral flanges 28 and bolts 29. A circular housing is provided by the sections and an ordinary pneumatic vehicle tire casing 30 is mounted therein. The cover section has its inner surface formed with an annular recess or seat 31 which is shaped to receive the bead and upper side wall of the horizontally disposed casing 30.

A plunger 32 operates in the chamber 24 and includes a circular head 33 and a stem 34. The plunger is disposed coaxially of the chamber and the casing is arranged concentrically of the head 33, which latter has an annular hanger 35, curved in cross-section and disposed below and surrounding a central boss 36 having a flat top. The upper side of the hanger is formed with an annular seat 37 shaped to fit the bead and lower side wall of the casing 30.

A circular pneumatic member or bellows 38 of rubber or other elastic material is mounted in the casing. This bellows has a tube-like marginal portion 39 and medial upper and lower flat diaphragms 40 and 41. The upper diaphragm lies against the flat underside of the cover section 27, while the lower diaphragm rests upon the boss 36. A valve stem 42, mounted in the cover section, has its lower end secured in the upper diaphragm and is used to supply air to the bellows to inflate the latter. A gage stem 43 is mounted in the cover section and has its lower end secured in the upper diaphragm so that air from the bellows may pass to a pressure gage 44 mounted on said stem. When the bellows is filled with air under pressure, the casing 30 will resist upward movement of the plunger 32.

At the medial portion of the shank 23, a transverse web 45 is formed and this web is provided with a central guide collar 46 on which the lower end of the plunger stem 34 rests. The liner 15 acts as a piston cylinder and a piston 47 is reciprocal therein. A rod 48 extends vertically from the piston and has a reduced stud 49 on its upper end, which latter has a sliding fit in a flanged bushing 50 mounted in the collar 46. The upper end of the stud is screw-threaded and engaged in a screw-threaded socket or well 51 in the bottom of the stem 34. The stem is fastened on the stud by a set screw 52. It will be observed that the top of the piston rod 48 is spaced a short distance below the bushing and this spacing represents the travel of the piston and undesired compression of the casing 30 is prevented by the engagement of said piston rod with said bushing.

It will be seen that when a sudden surge of pressure or force occurs in the fluid flowing through the line A and the T 10, the fluid under pressure acts against the bottom of the piston 47 and moves said piston and plunger 32 upwardly. As an illustration the device may be used with an oil-field pipe line through which fluid, such as oil or gas, is pumped. It is common to pump fluids under pressures of several hundred pounds per square inch. As a rule reciprocating pumps are used and such pumps set up a pulsating flow with the result that periodic impacts are imparted to the fluid causing it to surge. This surge or impact will act against the piston 47 and force it upwardly. This upward movement will be resisted by the 30 lbs. pressure in the bellows 38 and the shock or pressure surge will be absorbed and therefore the flow of the fluid in the line will be stabilized; also the load shock on the pump will be reduced.

An ordinary motor vehicle tire casing is used, largely as a matter of expediency, because such casings are built to stand sudden impacts and are readily available at a reasonable price; however, any elastic casing or reinforcement suitable for the purpose may be employed. The piston 47 may be of any suitable construction, but since the plunger 32 floats when fluid is flowing through the line, due to pressure variations, it is desirable to construct said piston as shown in detail in Fig. 3. Annular grooves 53 are formed in the peripheral face of the piston and receive piston rings 54. For sealing the bottom of the piston against upward by-passing of fluid, concentric oil rings 55 are confined against the bottom of the head by an annular plate 56, supported by shoulder screws or bolts 57. Vents 58 are provided in the bottom of the bowl 26 to release any pressure lock which might occur in the chamber 24 above the web 45. A drain 59 is provided in the flange 21 so that any fluid leaking by the piston into the shank 23 may escape.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fluid pressure surge device including, a housing having an annular seat in its upper portion, a circular elastic casing disposed horizontally in said housing having its upper side engaging the seat, a bellows in the casing, a plunger engaging the underside of the bellows and having a hanger engaging the underside of the casing, a cylinder adapted to receive a pressure fluid, and a piston movable in said cylinder engaging the plunger.

2. As a sub-combination in a fluid pressure surge device, a housing having an annular seat therein, a circular elastic casing in said housing engaging said seat, a circular bellows extending diametrically within the casing and exposed within the same, and a plunger movable within the housing having a medial portion engaging the bellows and a marginal portion engaging the casing.

3. A fluid pressure surge device including, a flow-line pipe connection, an upright cylinder connected with the pipe connection, a diametrically enlarged tubular shank having its lower end connected with the upper end of the cylinder, a piston vertically slidable in the cylinder having a piston rod, an enlarged chamber above the shank communicating therewith, a plunger in the chamber connected with the piston rod, and a sealed pneumatic member across the chamber free to be engaged and compressed by the plunger.

4. A fluid pressure surge device as set forth in claim 3, wherein the pneumatic member includes an annular elastic casing and a bellows engaging in said casing.

5. A fluid pressure surge device including, an upper chamber having a top, a cylinder below the chamber having a connection for the admission of a pressure fluid, a piston in the cylinder exposed to fluid admitted to the connection, a plunger in the chamber free from the walls thereof connected with and actuated by the piston, and a sealed pneumatic device in the chamber engaging the top thereof and engaged across its under side by the plunger.

6. A fluid pressure surge device as set forth in claim 5, wherein the pneumatic device includes an annular elastic casing engaging the marginal portion of a plunger head and a transverse bellows engaging the top of the chamber and the medial portion of said plunger and having its marginal portion in the casing.

7. A fluid pressure surge device including, a flow-line pipe connection, a cylinder connected to said connection and communicating therewith, a piston movable in said cylinder, an enclosure above said cylinder having a top, a pneumatic pressure-resisting member mounted in the said enclosure having an elastic annular casing in the enclosure seated against the top thereof and a bellows engaging in said casing, and a head connected to said piston and engaging said pneumatic member.

CLYDE D. HELM.

REFERENCES CITED

The following references are of record in the file of this patent:

UNITED STATES PATENTS

| Number | Name | Date |
|---|---|---|
| 359,315 | Cregier | Mar. 15, 1887 |
| 378,137 | Johnson | Feb. 21, 1888 |
| 841,196 | Thorp | Jan. 15, 1907 |
| 2,016,331 | Junkers | Oct. 8, 1935 |